May 21, 1963
W. A. CROWLEY
3,090,455
PLENUM CHAMBER TYPE GROUND EFFECT MACHINE WITH
SELF-PROPULSION AND STEERING MEANS
Filed Sept. 29, 1958
3 Sheets-Sheet 3
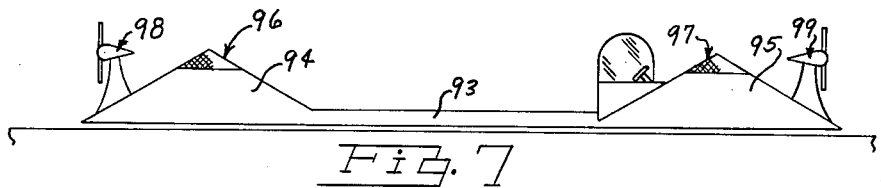
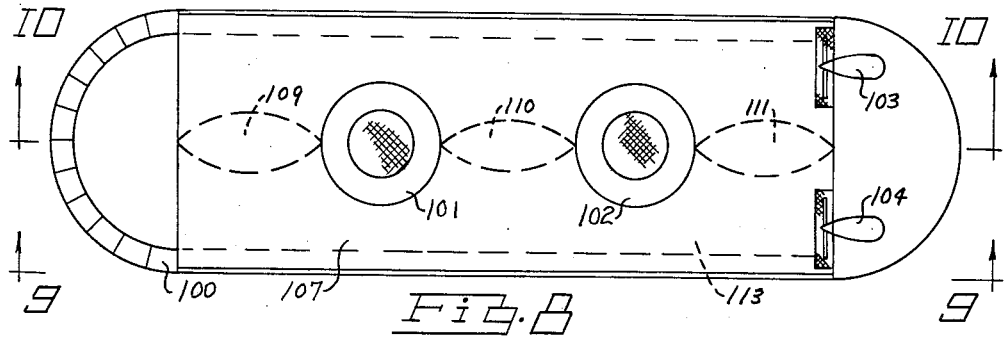
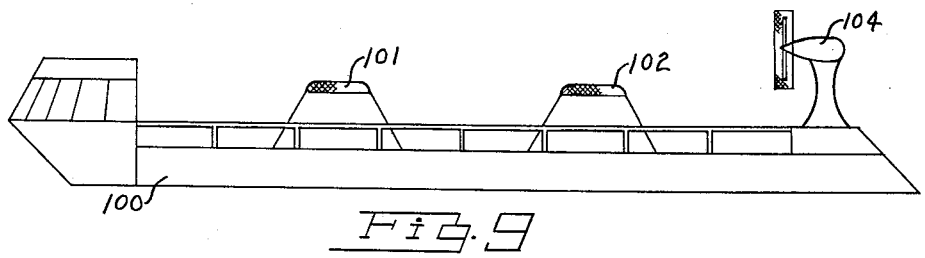
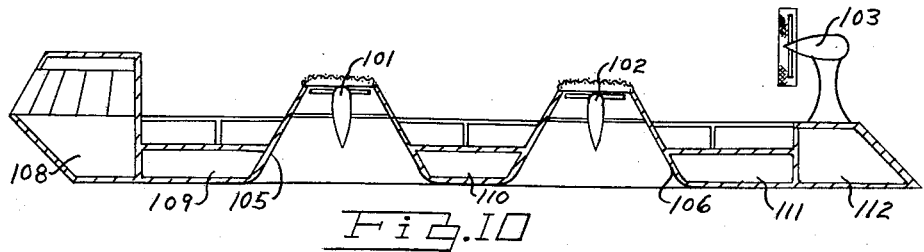
INVENTOR.
WALTER A. CROWLEY
BY Donnelly, Mentag & Herrington
ATTORNEYS United States Patent Office 3,090,455
Patented May 21, 1963

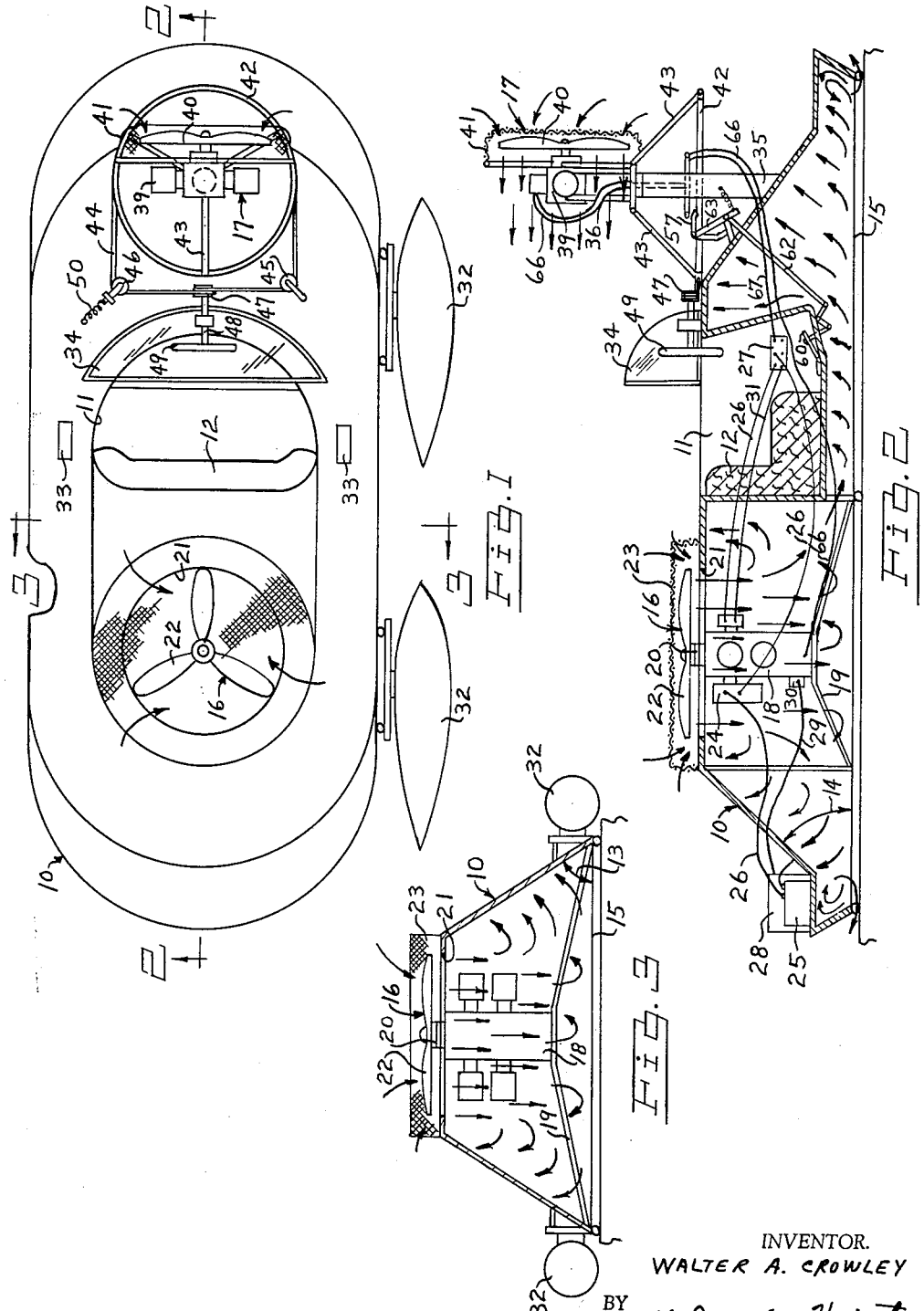

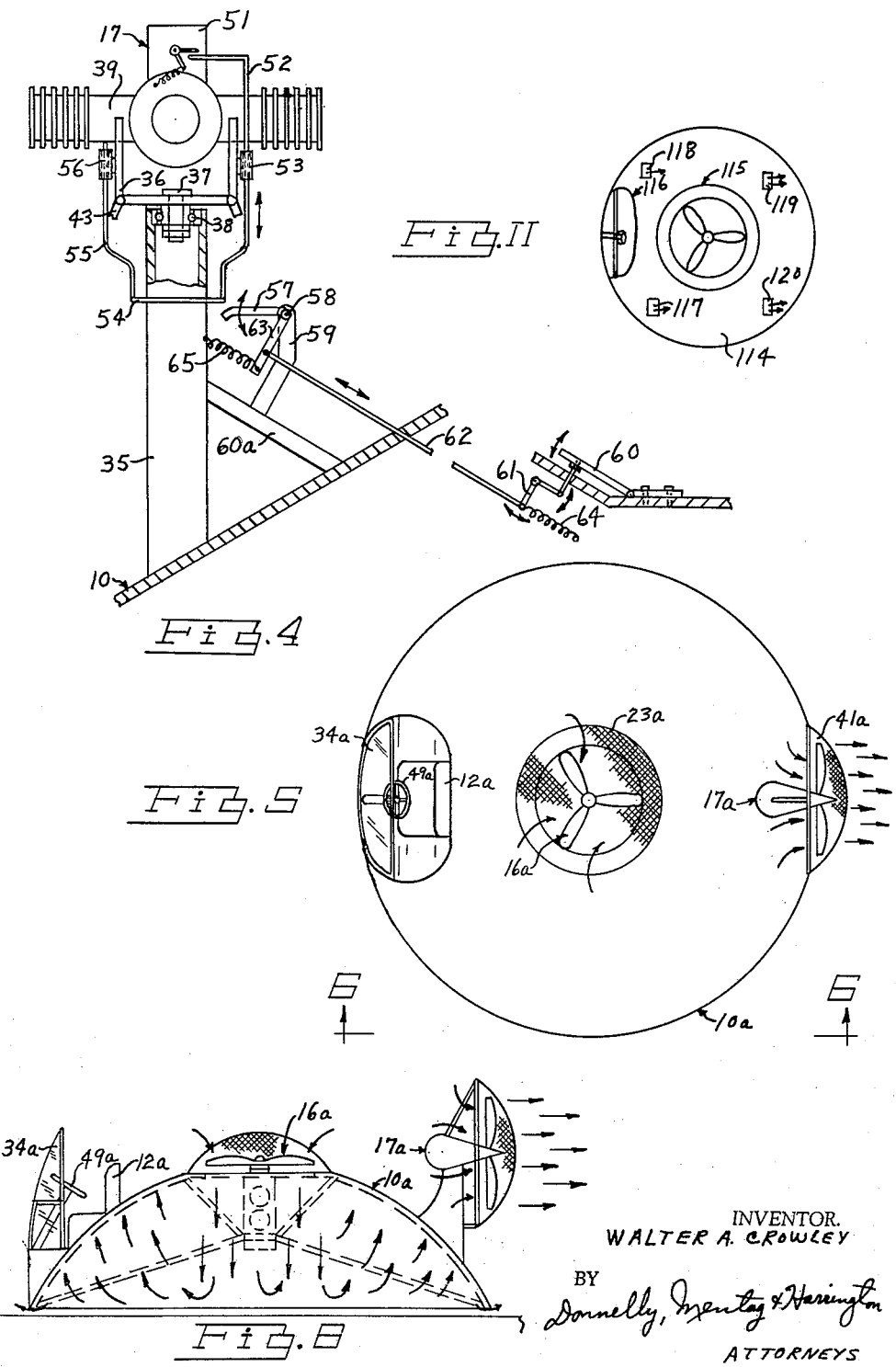

3,090,455
PLENUM CHAMBER TYPE GROUND EFFECT MACHINE WITH SELF-PROPULSION AND STEERING MEANS
Walter A. Crowley, Royal Oak, Mich., assignor, by mesne assignments, to Carwil Enterprises, Incorporated, Daytona Beach, Fla.
Filed Sept. 29, 1958, Ser. No. 763,919
20 Claims. (Cl. 180—7)

This invention relates generally to "hydro-air" vehicles, and, more particularly, to novel "hydro-air" vehicles which travel on air cushions or air bearings over land or water and are capable of being propelled at high rates of speed.

It is the primary object of this invention to provide a vehicle having a body provided with a hollow pressure chamber on the bottom thereof which is downwardly open and which vehicle is provided with lift means to maintain pressurized air inside of the chamber, whereby, the pressurized air raises the vehicle off the ground, or water, and the vehicle floats on the pressurized air or air cushion; and, wherein the vehicle has horizontal propulsion and steering means for horizontally propelling and steering the vehicle.

It is another object of this invention to provide a vehicle of the class described, which is simple, lightweight and compact in construction, with very few moving parts, safe and simple to operate, economical of manufacture, and which provides a smooth, fast mode of transportation even over rough ground or rough water.

It is a further object of this invention to provide a vehicle of the class described which may be made in different embodiments, as for example, for commercial passenger or cargo use over land and/or water; for military use as tank or troop carriers; and, for family vehicular purposes.

It is still another object of this invention to provide a vehicle of the class described which is self limiting in altitude and which is possessed of excellent stability in roll and pitch so that only yaw or steering control is required.

Other objects, features and advantages of this invention will be apparent from the following detailed description and appended claims, reference being had to the accompanying drawings forming a part of the specification wherein like reference numerals designate corresponding parts of the several views.

In the drawings:

FIG. 1 is a top-plan view of a "hydro-air" vehicle made in accordance with the principles of the invention;

FIG. 2 is a longitudinal elevational sectional view of the structure illustrated in FIG. 1, taken along the line 2—2 thereof, and looking in the direction of the arrows;

FIG. 3 is a transverse elevational sectional view of the structure illustrated in FIG. 1, taken along the line 3—3 thereof, and looking in the direction of the arrows;

FIG. 4 is a fragmentary, broken, side elevational view, with parts in section of the throttle control mechanism for the thrust engine employed in the embodiment of FIGS. 1 through 3;

FIG. 5 is a top plan view of a second "hydro-air" vehicle made in accordance with the principles of the invention;

FIG. 6 is a side elevational view of the structure illustrated in FIG. 5, taken along the line 6—6 thereof, and looking in the direction of the arrows;

FIG. 7 is a side elevational view of a "hydro-air" tank carrier made in accordance with the principles of the invention;

FIG. 8 is a top plan view of a "hydro-air" cargo sled embodying the principles of the invention;

FIG. 9 is a side elevational view of the structure illustrated in FIG. 8, taken along the line 9—9 thereof, and looking in the direction of the arrows;

FIG. 10 is an elevational sectional view of the structure illustrated in FIG. 8, taken along the line 10—10 thereof, and looking in the direction of the arrows; and, FIG. 11 is a top plan view of a "hydro-air" vehicle similar to the vehicle shown in FIG. 5 but showing a modified thrust means.

Referring now to the drawings, and in particular to FIGS. 1 through 4, wherein is illustrated an actual working embodiment of the invention, the numeral 10 generally illustrates the hollow bottomless body of the vehicle of this embodiment. The body 10 is provided with a cockpit 11 having a seat 12 for the seating of passengers and this cockpit is sealed to prevent loss of air pressure under the vehicle. The rest of the body 10 functions as an air pressure chamber. The body 10 may be made from any suitable material. In the illustrative working embodiment the body 10 comprises a welded frame made from one-half inch thin-wall steel tubing covered by a shroud or skin made from aluminum. Other suitable shroud materials which have been successfully used are fiberglass, canvas and cloth-backed plastic coverings.

The body 10 may be shaped as desired but in the illustrative embodiment it is shown as being substantially rectangular in plan view with downwardly and outwardly sloping sidewalls and with rounded ends. The illustrative working embodiment was made approximately 15 feet long, 8 feet wide and 3 feet high. The side and end walls of the body 10 are shown as being disposed at an acute angle to the horizontal plane of the lower edge of the body as illustrated by the numerals 13 and 14, respectively. The angles 13 and 14 may vary but it has been found that these angles should be within the range of from 30 to 90 degrees for optimum working results. The bottom of the body 10 is open as indicated by the numeral 15.

As shown in FIGS. 1 through 4, the hydro-air vehicle further includes lift means generally indicated by the numeral 16 and a propulsive power means for thrust and steering purposes generally indicated by the numeral 17. In the illustrative embodiment the lift means 16 is shown as being disposed in the rear portion of the body 10. The lift means 16 comprises engine driven pressurizing means which illustratively includes an air pump having a suitable engine as 18 which is fixedly mounted in the body 10 by any suitable means as by the braces 19. The drive shaft 20 of the engine 18 is disposed vertically and extends upwardly through the air inlet opening 21 formed in the top wall of the body 10. Fixedly mounted on the drive shaft 20 is an air pressurizing device in the form of an air pump impeller 22 which is enclosed by the protective screen 23. In the illustrative working embodiment the pump impeller is a three bladed wood impeller with a fixed pitch of 25 degrees, and the engine 18 is a 72 horsepower engine made by the McCulloch Motors Corp., Model 4318A. It will be understood that any suitable engine may be used and that a jet engine could be used for pressurizing instead of the motor-pump means illustrated.

The lift engine 18 is provided with the usual automatic starter as 24 which is powered from a conventional 6 volt automotive type battery as 25 which also provides ignition current. The battery 25, starter 24, and engine 18 are adapted to be operatively interconnected by the usual conductor cables as 26 so as to be operated from the control plate or board 27 disposed in the cockpit 11. The vehicle carries a conventional fuel tank as 28 for feeding fuel through a fuel line as 29 to the fuel pump 30. The engine 18 may be throttled and controlled by a suitable cable as 31 from the control board 27.

As shown in FIGS. 1 and 3, the body 10 may be provided with pontoons as 32 which may be fixedly mounted on each side of the body to permit the vehicle to be landed on water. As shown in FIG. 1, the body 10 is preferably provided with steps as 33 on each side thereof to permit easy entrance to the cockpit 11. A windshield 34 is also provided across the front end of the cockpit 11.

As shown in FIGS. 2 and 4, the propulsive thrust power means 17 is swivelly mounted on the vertical post 35 which is fixedly mounted on the front end of the vehicle. A bracket 36 carrying the pin 37 is swivelly mounted in the bearing means 38 on the upper end of the post 35. The thrust engine 39 is fixedly mounted on the supporting bracket 36 and is provided with the two-bladed propeller 40 which is enclosed in a protective screen 41. The thrust engine 39 may be of any suitable type. In the illustrative working embodiment a 22 horsepower Kierkaefer engine is used. Although a propeller type thrust means has been illustrated, it will be understood that a jet propulsion engine can be used for thrust purposes.

The thrust engine 39 is adapted to be swivelled for steering purposes by means of the large pulley 42 which is fixedly connected to the lower end of the bracket 36 by any suitable means as by the bracket arms 43. As best seen in FIG. 1, a nylon rope 44 is operatively engaged with the front end of the pulley 42 and this rope is also engaged with the pulleys 45 and 46 and the steering pulley 47. The pulley 47 is connected by means of the shaft 48 to the steering wheel 49. The pulley 46 is spring mounted as by means of the spring 50 so as to provide a constant tension on the rope 44 to keep it operatively engaged with the aforementioned pulleys. It will be seen that the vehicle may be steered by the aforementioned steering means and it has been found that best results are provided with the thrust engine 39 and steering means being located on the front end of the vehicle to provide a pulling effect rather than a pushing effect. With the thrust means located on the front end of the vehicle, a more accurate control over the movement of the vehicle is provided. The steering means is adapted to swivel the thrust engine 39 approximately 179° in either direction from the position shown in FIG. 1.

The thrust engine 39 is provided with the usual carburetor 51 which is controlled by the push rod 52. The push rod 52 is slidably mounted in the tube 53 and which is carried on the bracket 36. The lower end of the push rod 52 is fixedly connected to the ring 54 which is further supported on other side thereof by means of the second push rod 55 which is slidably mounted through the tube 56 which is fixedly connected to the bracket 36 at a point opposite to the tube 53. The push rod 52 is moved upwardly and downwardly to control the carburetor by means of the arm 57 which is hingedly mounted as at 58 on a bracket 59 which in turn is fixedly mounted on the bracket 60a supported between the post 35 and the body 10. It will be seen that the arm 57 may function to move the push rod 52 upwardly and downwardly and permit the engine 39 to be swivelled on the post 35. The arm 57 is adapted to be operated by means of the foot pedal 60 and the interconnecting linkages 61, 62 and 63 and the tension springs 64 and 65. The thrust engine 39 is adapted to be supplied with fuel from the fuel pump 30 which also supplies the lift engine 18 by means of suitable flexible conduits as 66. The conduits 66 are adapted to permit the thrust engine 39 to swivel about the axis of post 35. The ignition system of the thrust engine 39 is also suitably connected by means of the conductors as 67 and 26 from the control board 27 to the battery 25.

In use, the operator would first start the lift motor 18, and the impeller 22 pumps in replacement air to maintain the air pressure inside the chamber created by the hollow body 10 at a pressure above atmospheric pressure. The air pressure inside of the pressure chamber raises the vehicle off the ground, or water, and the air escapes around the open lower perimeter 15 of the body 10. The vehicle is thus floating on the air pressure as long as the average pressure times the average cross section area exceeds the gross weight of the vehicle. The propulsive thrust engine 39 is then actuated to provide movement to the vehicle. It will be obvious, that the vehicle may be easily steered by merely swivelling the thrust engine 39 as desired. The vehicle may be braked by reversing the thrust, that is, by reversing the thrust engine, by swivelling it around on the post 35. If desired, the propellor for the thrust engine 39 may be of the reversible pitch type so as to be used as a brake, or to back up, instead of turning the complete engine around. The vehicle may also be braked by reducing the speed of the engine 18 so as to decrease the lifting action and cause friction between the lower edge of the body 10 and the ground or water. The actual working embodiment illustrated in FIGS. 1 through 4 has safely and efficiently carried three adults.

An important advantage of the hydro-air vehicle of the present invention is its safeness in that it is self-limiting in altitude. It is self-limiting in altitude from a few inches to a few feet, depending on the design, size, and horsepower of the particular model, due to the immediate loss of lifting air pressure if the model is raised above its equilibrium height from the ground or other surfaces over which it is hovering or traveling, thus while forming a gap with the surface. This self-limiting in altitude feature or property prevents the vehicle from accidently, or deliberately, climbing to a height from where anyone could be injured by a rapid descent. A further safety feature of the hydro-air vehicle is that the vehicle will descend safely as the supporting pressure decreases if the lift engine 18 is shut off or fails. Another feature of the hydro-air vehicle is its simplicity of control. Due to the support or lift dependance upon air pressure between the vehicle and the ground or other surfaces, the wide area over which the pressure is distributed gives the vehicle excellent stability in roll and pitch control so that only yaw or steering control is required.

FIGS. 5 and 6 illustrate a second type hydro-air vehicle made in accordance with the principles of the invention. The embodiment of FIGS. 5 and 6 is substantially similar to the embodiment of FIGS. 1 through 4 and the same reference numeral followed by the small letter "a" has been used for the corresponding parts. A first difference between the instant embodiment and the first disclosed embodiment is that the shape has been changed. The number 10a indicates the hollow body of the vehicle which is substantially hemispherical in shape and open at the bottom side thereof. In the instant embodiment the lift means 16a is mounted centrally of the body 10a, with the thrust means 17a located at what may be termed the rear end of the vehicle and the steering wheel 49a located at the opposite or front end of the vehicle. The embodiment of the FIGS. 5 and 6 would function in generally the same manner as the embodiment of FIGS. 1 through 4. Two working models of the type shown in FIGS. 5 and 6 have been made and successfully operated. The one model was 31 inches in diameter and when equipped with a $\frac{1}{10}$ horsepower lift engine was able to support 38 pounds above the ground. The other model was 7 feet in diameter and lifted a gross weight of 300 pounds off the ground with a lift engine of 4 horsepower.

FIG. 7 is a side elevational view of a further embodiment of the invention as specifically, of a tank or troop carrying platform. The vehicle of FIG. 7 comprises the platform 93 which is adapted to carry cargo such as tanks or troops and it is fixedly connected at each end thereof to hollow bodies or cones 94 and 95. The cones 94 and 95 are equipped with a lift means generally indicated by the numerals 96 and 97 respectively, and with a thrust means generally indicated by the numerals 98 and 99 respectively. The vehicle of FIG. 7 would be especially useful for carrying troops, tanks and military equipment across rivers, marshes and the like. The lift provided by the two cones 94 and 95 would be equal to the sum of the areas of the bottom of the two cones in square inches times the average air pressure in pounds per square inches which could be maintained inside the cones by the lift means 96 and 97. Since the cones are essentially in contact with the ground, the pressure required to lift the vehicle plus its payload, will be equal to the gross weight in pounds divided by the bottom area of the cones in square inches. The platform 93 is preferably also a hollow open bottomed structure which communicates with the hollow cones 94 and 95 to provide additional compression chamber space for additional lifting capacity.

FIGS. 8, 9 and 10 illustrate a "hydro-air" cargo vehicle made in accordance with the principles of the invention. The numeral 100 indicates the hollow body of the cargo vehicle which may be used as a cargo barge or sled and it could be used in multiples or train fashion. The vehicle of FIGS. 8, 9 and 10 is provided with a lift means 101 and 102, and the vehicle further includes twin thrust and steering means 103 and 104. The aforementioned lift and thrust means are shown respectively as engine driven impeller means and engine driven propeller means but it will be understood that they could be of any other suitable type, as for example, jet engine means or turboprop engine means. The lift means is mounted in the two conical centrally disposed ducts 105 and 106 as shown in FIG. 10. The deck area 107 would be used for cargo carrying space and a cabin as 108 is provided at the forward end thereof. The spaces 109, 110 and 111 would be enclosed to provide bouyancy tanks available for use as fuel tanks and the like. The space 112 would form a second cabin in the aft end of the vehicle. The space 113 under the cargo carrying deck 107 is in communication with the cones 105 and 106 to provide additional compression chamber space for lift purposes.

FIG. 11 illustrates a further embodiment of the invention which is similar to that of FIG. 5 but wherein the thrust means is provided in a different manner. The numeral 114 indicates a hollow body identical to body 10a of FIG. 5. The numeral 115 represents a lift means, numeral 116 represents the cockpit and control steering wheel position, and, numerals 117, 118, 119 and 120 represent suitable valves for bleeding off air, in jets having the horizontal rearward direction indicated by the arrows, from the compression chamber for steering and thrust purposes. By having openings and valves therefor as 117, 118 and, 119 and 120, the lift means 115 may be utilized for both lift power purposes and thrust and steering purposes.

The embodiments shown herein are merely illustrative of the many types of vehicles which may be made in accordance with the principles of the invention. For example, the vehicles which may be made in accordance with the principles of the invention may include airplane carriers, ocean crossing liners, ferry boats, landing craft, missile launchers, and the like.

While it will be apparent that the preferred embodiments of the invention herein disclosed are well calculated to fulfill the objects above stated, it will be appreciated that the invention is susceptible to modification, variation and change without departing from the proper scope or fair meaning of the subjoined claims.

What I claim is:

1. A vehicle adapted to be raised from a surface by gas pressure and travel and be steered at low altitude represented by a perimetrical gas escape gap relative to said surface, said vehicle including a body having an upwardly extending downwardly open hollow underside for gas, said hollow underside being in communication under said body with the atmosphere when the body is raised over the surface to be traveled, and means for vertically lifting, horizontally propelling and steering the vehicle, said means including engine driven pressurizing means on the vehicle and communicating with said hollow underside for maintaining gas under pressure in said hollow underside and in cushion under said body for lifting the vehicle upward only in the region of ground effect and supporting the vehicle into a horizontally idle hovering position with said body forming with said surface said perimetrical gas escape gap which gap under given load on the vehicle has magnitude varying with gas pressure then available in total from said engine driven pressurizing means for lifting the vehicle in view of amounts of said gas escaping from the hollow underside to the atmosphere, and said first mentioned means further including horizontal propulsion and steering means on the vehicle for the vehicle to horizontally propel itself and be steered through the air above said surface while supply of gas to said hollow underside and in cushion under said body is continued from said engine driven pressurizing means to support said body above said surface in a perimetrical lift gap forming relation to said surface.

2. A vehicle as defined in claim 1, in which a plurality of gas inlets communicate with the same space within said hollow underside, and said engine driven pressurizing means includes a plurality of gas pressurizing devices each in a corresponding one of said inlets for moving gas into said space through the corresponding said inlet, said devices having engines, each said engine being drivingly connected with an apportioned number of said devices.

3. A vehicle adapted to be raised from a surface by gas pressure and travel and be steered at low altitude represented by a perimetrical gas escape gap relative to said surface, said vehicle including a body having an upwardly extending downwardly open hollow underside for gas, said hollow underside being in communication under said body with the atmosphere when the body is raised over the surface to be traveled, and means for vertically lifting, horizontally propelling and steering the vehicle, said means including pressurizing means on the vehicle and communicating with said hollow underside for maintaining gas under pressure in said hollow underside and in cushion under said body for lifting the vehicle upward only in the region of ground effect and supporting the vehicle into a horizontally idle hovering position with said body forming with said surface said perimetrical gas escape gap which gap under given load on the vehicle has magnitude varying with gas pressure then available in total from said pressurizing means for lifting the vehicle in view of amounts of said gas escaping from the hollow underside to the atmosphere, and said first mentioned means further including steering and horizontal propulsion means on the vehicle for the vehicle to horizontally propel itself in selectively forward and reverse directions through the air above said surface and be steered and braked while supply of gas to said hollow underside and in cusion under said body is continued from said pressurizing means to support said body above said surface in a perimetrical lift gap forming relation to said surface.

4. A vehicle adapted to be raised from a surface by gas pressure and travel and be streered at low altitude represented by a perimetrical gas escape gap relative to said surface, said vehicle including a body having an upwardly extending downwardly open hollow underside for gas, said hollow underside being in communication under said body with the atmosphere when the body is raised over the surface to be traveled, and means for vertically lifting, horizontally propelling and steering the vehicle, said means including pressurizing means on the vehicle and communicating with said hollow underside for maintaining gas under pressure in said hollow underside and in cushion under said body for lifting the vehicle upward only in the region of ground effect and supporting the vehicle into a horizontally idle hovering position with said body forming with said surface said perimetrical gas escape gap which gap under given load on the vehicle has magnitude varying with gas pressure then available in total from said pressurizing means for lifting the vehicle in view of amounts of said gas escaping from the hollow underside to the atmosphere, and said first mentioned means further including steering and horizontal thrust propulsion means swivelly mounted on the vehicle for the vehicle to be steered and horizontally propel itself through the air above said surface while supply of gas to said hollow underside and in cushion under said body is continued from said pressurizing means to support said body above said surface in a perimetrical lift gap forming relation to said surface.

5. A vehicle as defined in claim 4, wherein said steering and horizontal thrust propulsion means is swivelly mounted on the vehicle so as to be rotatable in either direction of rotation to horizontally propel the vehicle selectively in forward and reverse directions and for the vehicle to be steered.

6. A vehicle adapted to be raised from a surface by gas pressure and travel and be steered at low altitude represented by a perimetrical gas escape gap relative to said surface, said vehicle including a body having an upwardly extending downwardly open hollow underside for gas, said hollow underside being in communication under said body with the atmosphere when the body is raised over the surface to be traveled, and means for vertically lifting, horizontally propelling and steering the vehicle, said means including pressurizing means on the vehicle and communicating with said hollow underside for maintaining gas under pressure in said hollow underside and in cushion under said body for lifting the vehicle upward only in the region of ground effect and supporting the vehicle into a horizontally idle hovering position with said body forming with said surface said perimetrical gas escape gap which gap under given load on the vehicle has magnitude varying with gas pressure then available in total from said pressurizing means for lifting the vehicle in view of amounts of said gas escaping from the hollow underside to the atmosphere, control means on the vehicle to vary the lifting effect of said pressurizing means so that ascent of the vehicle vertically to hovering position and descent of the vehicle may be achieved, said first mentioned means further including steering and horizontal propulsion means on the vehicle for the vehicle to be steered and horizontally propel itself through the air above said surface while supply of gas to said hollow underside and in cushion under said body is continued from said pressurizing means to support said body above said surface in a perimetrical lift gap forming relation to said surface, and horizontal propulsion control means for controlling horizontal propulsion.

7. A vehicle adapted to be raised from a surface by gas pressure and travel and be steered at low altitude represented by a perimetrical gas escape gap relative to said surface, said vehicle including a body having an upwardly extending downwardly open hollow underside for gas, said hollow underside being in communication under said body with the atmosphere when the body is raised over the surface to be traveled, and means for vertically lifting, horizontally propelling and steering the vehicle, said means including pressurizing means on the vehicle and communicating with said hollow underside for maintaining gas under pressure in said hollow underside and in cushion under said body for lifting the vehicle upward only in the region of ground effect and supporting the vehicle into a horizontally idle hovering position with said body forming with said surface said perimetrical gas escape gap which gap under given load on the vehicle has magnitude varying with gas pressure then available in total from said pressurizing means for lifting the vehicle in view of amounts of said gas escaping from the hollow underside to the atmosphere, means for throttling said pressurizing means to vary the input of gas to said hollow underside whereby ascent vertically to hovering postion and descent of the vehicle may be achieved, said first mentioned means further including steering and horizontal propulsion means on the vehicle for the vehicle to be steered and horizontally propel itself through the air above said surface while supply of gas to said hollow underside and in cushion under said body is continued from said pressurizing means to support said body above said surface in a perimetrical lift gap forming relation to said surface, and horizontal propulsion control means for controlling horizontal propulsion.

8. A vehicle adapted to be raised from the surface of water by gas pressure and to travel in the air at low altitude represented by a perimetrical gas escape gap relative to said surface, said vehicle including a body having means for the vehicle to be buoyed and remain afloat on water and having an upwardly extending downwardly open hollow underside for gas, said hollow underside being in communication under said body with the atmosphere when the body is raised over said surface to be traveled, and means for vertically lifting, horizontally propelling and steering the vehicle, the latter said means including pressurizing means on the vehicle and communicating with said hollow underside for maintaining gas under pressure in said hollow underside and in cushion under said body for lifting the vehicle upward only in the region of ground effect and supporting the vehicle in a horizontally idle hovering position with said body forming with said surface of the water said perimetrical gas escape gap which gap under given load on the vehicle has magnitude varying with gas pressure then available in total from said pressurizing means for lifting the vehicle in view of amounts of said gas escaping from the hollow underside to the atmosphere, control means on the vehicle to vary the lifting effect of said pressurizing means so that ascent of the vehicle vertically to hovering position and descent of the vehicle may be achieved, said means for vertically lifting, horizontally propelling and steering the vehicle further including steering and horizontal propulsion means on the vehicle for the vehicle to be steered and horizontally propel itself through the air above the surface of the water while supply of gas to said hollow underside and in cushion under said body is continued from said pressurizing means to support said body above said surface in a perimetrical lift gap forming relation to said surface, and horizontal propulsion control means for controlling horizontal propulsion.

9. A vehicle as defined in claim 8, wherein said means for the vehicle to be buoyed and remain afloat on water includes pontoon means appended to said body to contact the water when the vehicle is brought down on water.

10. A vehicle adapted to be raised from a surface by gas pressure and travel and be steered at low altitude represented by a perimetrical gas escape gap relative to said surface, said vehicle including a body having an upwardly extending downwardly open hollow underside for gas, said hollow underside being in communication under said body with the atmosphere when the body is raised over the surface to be traveled, and means for vertically lifting, horizontally propelling and steering the vehicle, said means including pressurizing means on the vehicle and communicating with said hollow underside for maintaining gas under pressure in said hollow underside and in cushion under said body for lifting the vehicle upward only in the region of ground effect and supporting the vehicle into a horizontally idle hovering position with said body forming with said surface said perimetrical gas escape gap which gap under given load on the vehicle has magnitude varying with gas pressure then available in total from said pressurizing means for lifting the vehicle in view of amounts of said gas escaping from the hollow underside to the atmosphere, and said first mentioned means further including horizontal propulsion jet and steering jet means on the vehicle for the vehicle to horizontally jet propel itself through the air above said surface and be jet steered while supply of gas to said hollow underside and in cushion under said body is continued from said pressurizing means to support said body above said surface in a perimetrical lift gap forming relation to said surface.

11. A vehicle adapted to be raised from a surface by gas pressure and travel and be steered at low altitude represented by a perimetrical gas escape gap relative to said surface, said vehicle including a body having an upwardly extending downwardly open hollow underside for gas, said hollow underside being in communication under said body with the atmosphere when the body is raised over the surface to be traveled, and means for vertically lifting, horizontally propelling and steering the vehicle, said means including pressurizing means on the vehicle and communicating with said hollow underside for maintaining gas under pressure in said hollow underside and in cushion under said body for lifting the vehicle upward only in the region of ground effect and supporting the vehicle into a horizontally idle hovering position with said body forming with said surface said perimetrical gas escape gap which gap under given load on the vehicle has magnitude varying with gas pressure then available in total from said pressurizing means for lifting the vehicle in view of amounts of said gas escaping from the hollow underside to the atmosphere, and said first mentioned means further including steering and horizontal propulsion means on the vehicle and communicating with said pressurizing means for delivering thrust of gas under pressure from said pressurizing means to the vehicle for the vehicle to horizontally propel itself through the air above said surface and be steered while supply of gas to said hollow underside and in cushion under said body is continued from said pressurizing means to support said body above said surface in a perimetrical lift gap forming relation to said surface.

12. A vehicle adapted to be raised from a surface by gas pressure and travel and be steered at low altitude represented by a perimetrical gas escape gap relative to said surface, said vehicle including a body having an upwardly extending downwardly open hollow underside for gas, said hollow underside being in communication under said body with the atmosphere when the body is raised over the surface to be traveled, and means for vertically lifting, horizontally propelling and steering the vehicle, said means including pressurizing means on the vehicle and communicating with said hollow underside for maintaining gas under pressure in said hollow underside and in cushion under said body for lifting the vehicle upward only in the region of ground effect and supporting the vehicle into a horizontally idle hovering position with said body forming with said surface said perimetrical gas escape gap which gap under given load on the vehicle has magnitude varying with gas pressure then available in total from said pressurizing means for lifting the vehicle in view of amounts of said gas escaping from the hollow underside to the atmosphere, and said first mentioned means further including steering and horizontal propulsion means on the vehicle and communicating with said hollow underside for delivering thrust of gas under pressure from said hollow underside to the vehicle for the vehicle to horizontally propel itself through the air above said surface and be steered while supply of gas to said hollow underside and in cushion under said body is continued from said pressurizing means to support said body above said surface in a perimetrical lift gap forming relation to said surface.

13. A vehicle adapted to be raised from a surface by gas pressure and travel and be steered at low altitude represented by a perimetrical gas escape gap relative to said surface, said vehicle including a body having a plurality of upwardly extending downwardly open compression chambers for gas, said compression chambers being in communication under said body with the atmosphere when the body is raised over the surface to be traveled, and means for vertically lifting, horizontally propelling and steering the vehicle, said means including pressurizing means on the vehicle and communicating with said compression chambers for maintaining gas under pressure in said chambers and in cushion under said body for lifting the vehicle upward only in the region of ground effect and supporting the vehicle in a horizontally idle hovering position with said body forming with said surface said perimetrical gas escape gap which gap under given load on the vehicle has magnitude varying with gas pressure then available in total from said pressurizing means for lifting the vehicle in view of amounts of said gas escaping from the compression chambers to the atmosphere, and said first mentioned means further including steering and horizontal propulsion means on the vehicle for the vehicle to be steered and horizontally propel itself through the air above said surface while supply of gas to said compression chambers and in cushion under said body is continued from said pressurizing means to support said body above said surface in a perimetrical lift gap forming relation to said surface.

14. A vehicle as defined in claim 13, wherein said compression chambers are in spaced apart positions longitudinally of said body.

15. A vehicle as defined in claim 13, wherein said plurality of compression chambers includes a pair of said chambers with one of said pair of chambers being located at one end of said body and the other of said pair of chambers being located at the other end of said body, and said body includes a platform between said pair of compression chambers.

16. A vehicle adapted to be raised from a surface by gas pressure and travel and be steered at low altitude represented by a perimetrical gas escape gap relative to said surface, said vehicle including a body having an upwardly extending downwardly open hollow underside for gas, said hollow underside being in communication under said body with the atmosphere when the body is raised over the surface to be traveled, and means for vertically lifting, horizontally propelling and steering the vehicle, said means including pressurizing means on the vehicle and communicating with said hollow underside for maintaining gas under pressure in said hollow underside and in cushion under said body for lifting the vehicle upward only in the region of ground effect and supporting the vehicle into a horizontally idle hovering position with said body forming with said surface said perimetrical gas escape gap which gap under given load on the vehicle has magnitude varying with gas pressure then available in total from said pressurizing means for lifting the vehicle in view of amounts of said gas escaping from the hollow underside to the atmosphere, said first mentioned means further including steering and horizontal propulsion means on the vehicle for steering and horizontally propelling the vehicle through the air above said surface while the supply of gas to said hollow underside and in cushion under said body is continued from said pressurizing means to support said body above said surface in a perimetrical lift gap forming relation to said surface.

17. A vehicle as defined in claim 16, in which a plurality of gas inlets to said hollow underside empty at different locations into the same space within said hollow underside and communicate with said pressurizing means for said pressurizing means to supply gas to said space through said inlets.

18. A vehicle as defined in claim 16, in which a plurality of gas inlets to said hollow underside empty at different locations into the same space within said hollow underside and communicate with said pressurizing means, and said pressurizing means includes a plurality of gas pressurizing devices each in a corresponding one of said inlets for said pressurizing means to supply gas to said space through said inlets.

19. A vehicle as defined in claim 16, in which a gas inlet to said hollow underside is downwardly directed into said hollow underside and said pressurizing means communicates with said inlet and supplies gas in a downward direction into said hollow underside through said inlet.

20. A vehicle as defined in claim 16, in which a plurality of gas inlets communicate with the same space within said hollow underside, and said pressurizing means includes a plurality of gas pressurizing devices each in a corresponding one of said inlets for moving gas into said space through the corresponding said inlet.

References Cited in the file of this patent

UNITED STATES PATENTS

| | | |
|---|---|---|
| 936,395 | Worthington | Oct. 12, 1909 |
| 1,621,625 | Casey | Mar. 22, 1927 |
| 1,698,482 | Nicin | Jan. 8, 1929 |
| 2,218,938 | Rinne | Oct. 22, 1940 |
| 2,439,196 | Wolf et al. | Apr. 6, 1948 |
| 2,444,318 | Warner | June 29, 1948 |
| 2,511,979 | Goddard | June 20, 1950 |
| 2,738,845 | Bizjak | Mar. 20, 1956 |
| 2,780,826 | Coons et al. | Feb. 12, 1957 |
| 2,834,560 | Werner et al. | May 13, 1958 |
| 2,838,257 | Wibault | June 10, 1958 |
| 2,842,084 | Williams | July 8, 1958 |
| 2,918,183 | Petersen et al. | Dec. 22, 1959 |

OTHER REFERENCES

Finish publication "Teknillinen Aikakauslehti," No. 2, 1942, article entitled "Air Cushioned Surface Vehicle," pages 43 through 48.

Publication: "Popular Mechanics," July 1957, pages 74–78.